(12) United States Patent
Yeh et al.

(10) Patent No.: US 11,054,080 B2
(45) Date of Patent: Jul. 6, 2021

(54) SUPPORTING DEVICE AND METHOD FOR MANUFACTURING THE SAME

(71) Applicant: SYNCMOLD ENTERPRISE CORP., New Taipei (TW)

(72) Inventors: Chien-Cheng Yeh, New Taipei (TW); Hung-Chang Su, New Taipei (TW); Ching-Hui Yen, New Taipei (TW)

(73) Assignee: SYNCMOLD ENTERPRISE CORP., New Taipei (TW)

( * ) Notice: Subject to any disclaimer, the term of this patent is extended or adjusted under 35 U.S.C. 154(b) by 94 days.

(21) Appl. No.: 16/372,794

(22) Filed: Apr. 2, 2019

(65) Prior Publication Data
US 2019/0316732 A1    Oct. 17, 2019

Related U.S. Application Data

(60) Provisional application No. 62/656,514, filed on Apr. 12, 2018.

(30) Foreign Application Priority Data

Sep. 15, 2018 (TW) ................................. 107212617

(51) Int. Cl.
*F16M 11/20* (2006.01)
*F16M 11/22* (2006.01)
*F16M 11/16* (2006.01)

(52) U.S. Cl.
CPC ......... *F16M 11/2014* (2013.01); *F16M 11/16* (2013.01); *F16M 11/22* (2013.01); *F16M 2200/028* (2013.01); *F16M 2200/08* (2013.01)

(58) Field of Classification Search
CPC .... F16M 11/2014; F16M 11/16; F16M 11/22; F16M 2200/028; F16M 2200/08
See application file for complete search history.

(56) References Cited

U.S. PATENT DOCUMENTS

| 7,984,881 B2 * | 7/2011 | Liu | F16M 11/22 248/121 |
| 8,339,776 B2 * | 12/2012 | Takao | F16M 11/22 361/679.21 |
| 9,715,249 B2 * | 7/2017 | Kim | F16M 11/28 |
| 2011/0149181 A1 * | 6/2011 | Kim | F16M 11/18 348/836 |
| 2013/0077214 A1 * | 3/2013 | Kondo | F16M 11/08 361/679.01 |

* cited by examiner

*Primary Examiner* — Anita M King
(74) *Attorney, Agent, or Firm* — Muncy, Geissler, Olds & Lowe, P.C.

(57) ABSTRACT

A supporting device and a method for manufacturing the supporting device are provided. The supporting device comprises an upright and a base. The base includes a substrate, a covering unit, and a rotating unit, wherein the base is made by injection molding.

8 Claims, 5 Drawing Sheets

SUPPORTING DEVICE AND METHOD FOR MANUFACTURING THE SAME

CROSS REFERENCE TO RELATED APPLICATION

This application claims the benefit of U.S. Provisional Application Ser. No. 62/656,514 filed on Apr. 12, 2018, and the benefit of Taiwan Patent Application Ser. No. 107212617 filed on Sep. 15, 2018. The entirety of each said Application is incorporated herein by reference.

BACKGROUND OF THE INVENTION

1. Field of the Invention

The present invention relates to a supporting device and a method for manufacturing the supporting device. More particularly, the present invention relates to a supporting device comprising an upright and a substrate formed by injection molding for bearing a display.

2. Description of Related Art

A conventional supporting device generally includes a base, an upright, and a carrier for being placed on a working surface and bearing a display. However, the conventional base is usually assembled with a plastic upper shell, a metal substrate, a plastic lower shell, and a plurality of fasteners. More components will be needed if the base enables the supporting device to swivel on the working surface. Therefore, due to the numerous assembly parts of the conventional base, the assembly procedure would be complex and time-consuming, and tends to accumulate larger tolerances on the assembly.

SUMMARY OF THE INVENTION

The main object of the present invention is to form a base of a supporting device by injection molding which is relatively rapid comparing to the conventional complicated and cumbersome assembly procedures, thereby improving product production efficiency.

Another object of the present invention is to simplify the assembly procedure. Unlike the prior art that the components required for the supporting device are numerous and the assembly procedures are complicated, the present invention replaces the original partial assembly step by injection molding. By reducing the components and simplifying the assembly procedures, tolerances of various components are not easily accumulated during the complex assembly procedures.

In order to achieve the above objects, a supporting device for carrying a display on a working surface is disclosed in the present invention. The supporting device comprises a base and an upright. The base is utilized to be disposed on the working surface and includes a substrate, a covering unit, and a rotating unit. The substrate has at least one limiting hole and at least one fastener wherein the fastener is disposed through the limiting hole, and protrudes in a direction away from the working surface. The covering unit covers the substrate and has at least one protruding portion formed corresponding to and covering the fastener. The rotating unit is rotatably disposed on one of the substrate and the covering unit. When the supporting device is placed on the working surface, the rotating unit is firmly in contact with the working surface, so that the substrate and the covering unit are able to rotate with respect to the rotating unit. The upright is inserted by the protruding portion of the base and secured with the base, and the upright is used for supporting the display.

When an external force is applied, the substrate and the covering unit horizontally rotate with respect to the working surface by the rotating unit, so that the upright and the display synchronously rotate horizontally with respect to the working surface. When the external force is removed, the upright and the display immediately stop with respect to the working surface.

In an embodiment, the covering unit further has an upper shell and a lower shell. The upper shell covers one side of the substrate, the lower shell covers the other side of the substrate, and the upper shell and the lower shell are formed integrally. The substrate is embedded in the covering unit by the injection molding.

The substrate further has a center hole, and the lower shell has at least one opening.

The rotating unit has a rotating piece and a spacer. The spacer is disposed on the rotating piece and is in contact with the working surface. When the substrate and the covering unit horizontally rotate with respect to the working surface, the rotating unit is stationary without movement.

Either the rotating piece or the spacer has a hole, and the covering unit further comprises a shaft extending toward the working surface and passing through the center hole of the substrate and the holes, so that the rotating unit is disposed on one of the substrate and the covering unit.

The covering unit further has a plurality of pads disposed on the lower shell of the covering unit and in contact with the working surface. The maximum static friction between the spacer and the working surface is greater than the maximum static friction between the pads and the working surface.

In another embodiment, the supporting device further includes at least one anti-rust patch, and the anti-rust patch is disposed in the opening and attached to the substrate.

A method for manufacturing a supporting device is further disclosed in the present invention. The method comprises the steps of:

(i) providing the substrate having a first surface, a second surface, a center hole, the limiting hole, and the fastener, wherein the fastener is secured in the limiting hole.

(ii) fixing the substrate into a mold; and (iii) injecting plastic material into the mold to form the covering unit wrapping the substrate.

In another embodiment, the method further comprises the step (iv): assembling the rotating unit to the substrate or the covering unit.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
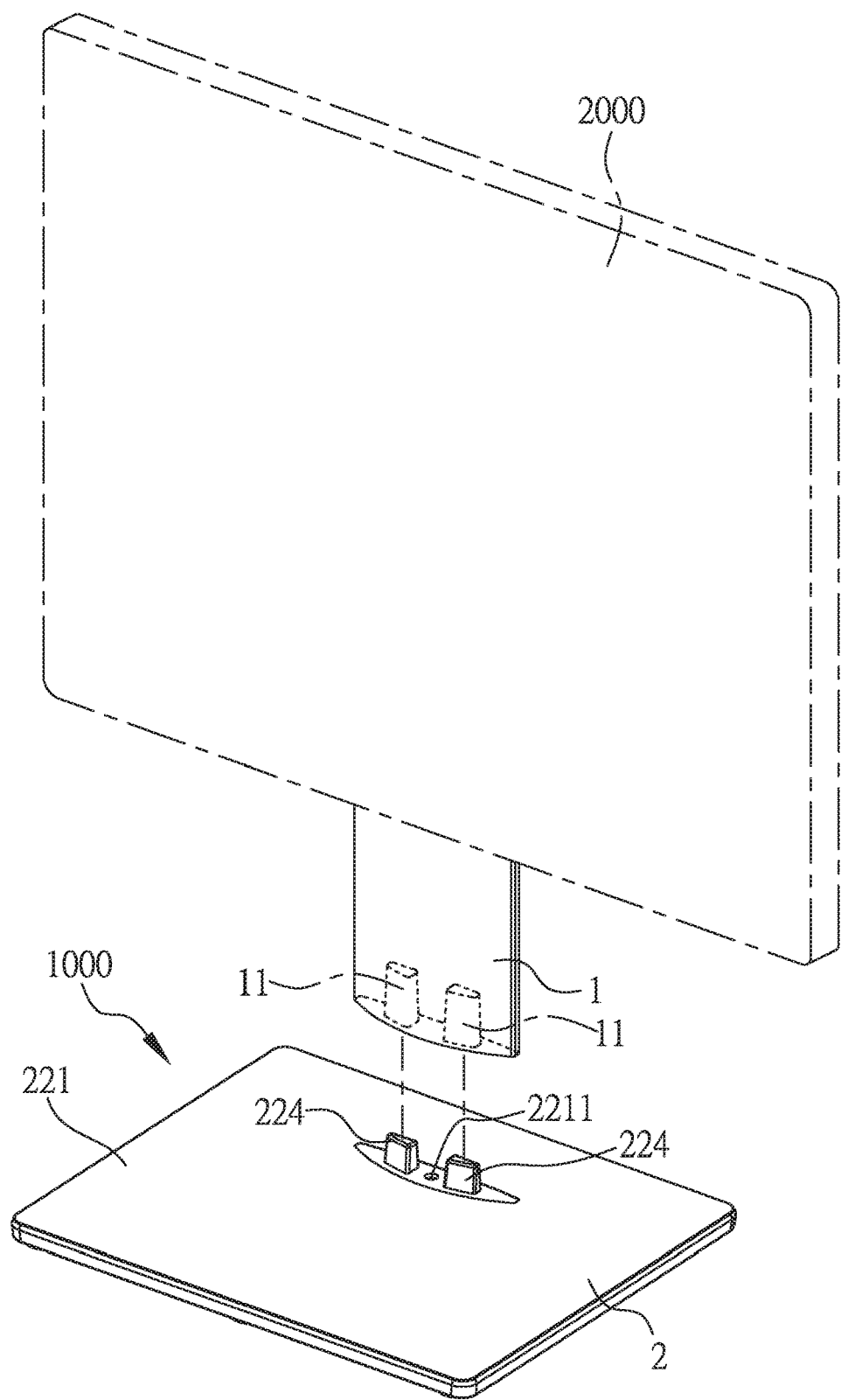
FIG. 1 is a perspective view of the supporting device of the present invention.

Please refer to the supporting device 1000 shown in FIG. 1. The supporting device 1000 is used for bearing a display 2000 on a working surface. The supporting device 1000 mainly comprises an upright 1 and a base 2, and the upright 1 includes two alignment holes 11 and a carrier (not shown). The upright 1 is disposed on the base 2 through the alignment holes 11 and bears the display 2000 through the carrier.

Figure 2:
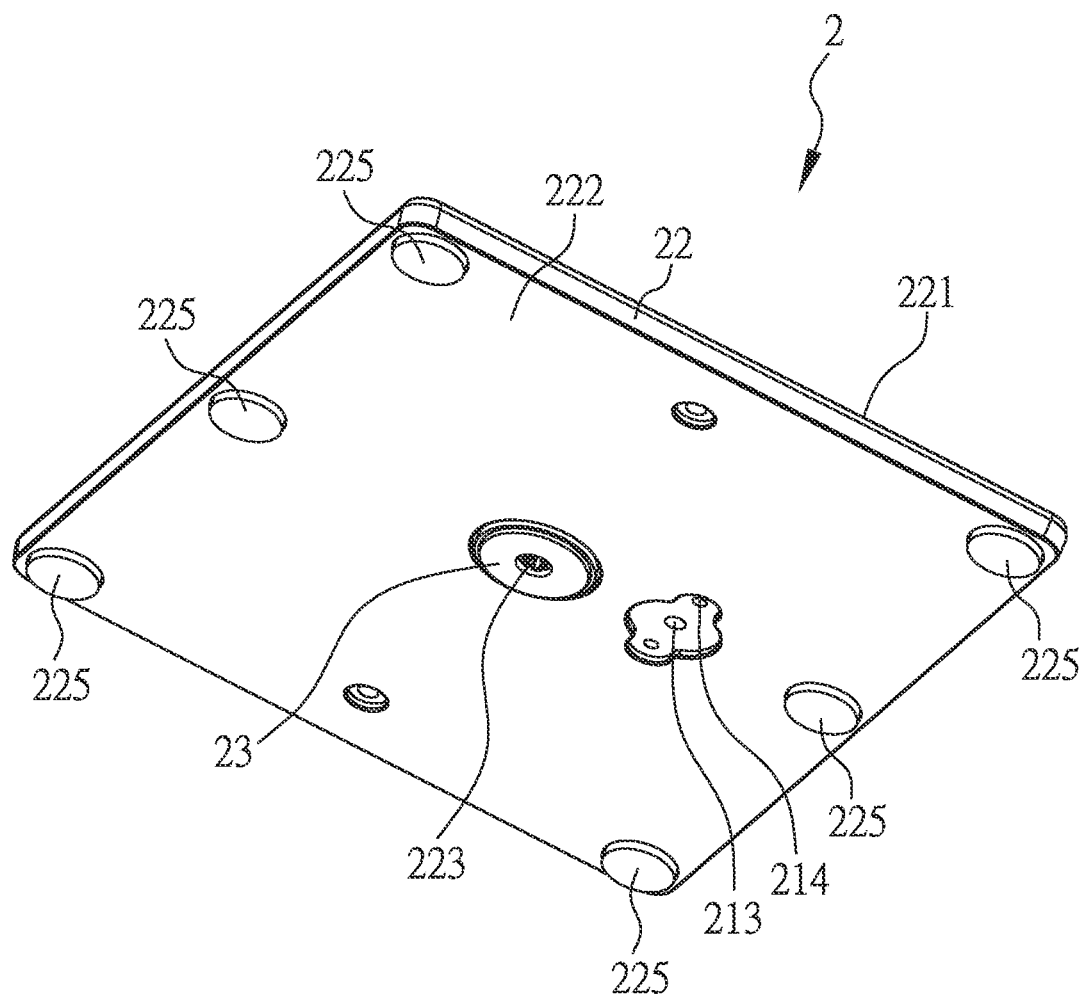
FIG. 2 is a bottom perspective view of the base of the supporting device of the present invention.
Figure 3:
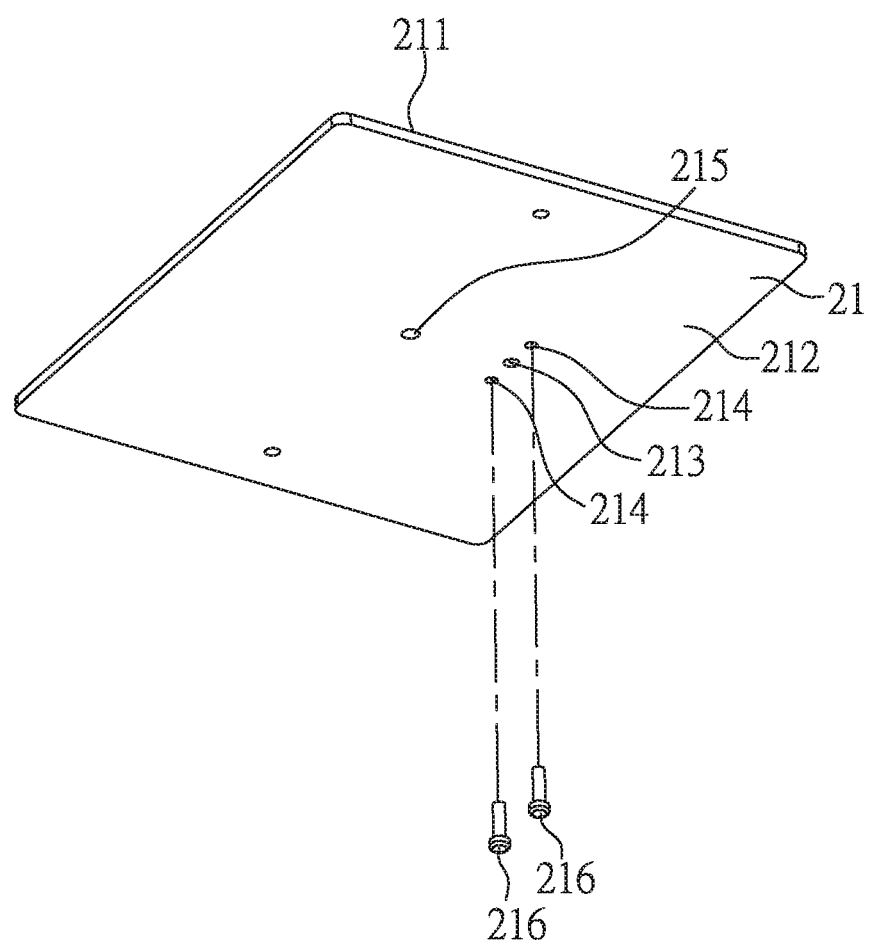
FIG. 3 is a partial perspective view of the base of the supporting device of the present invention.
Figure 4:
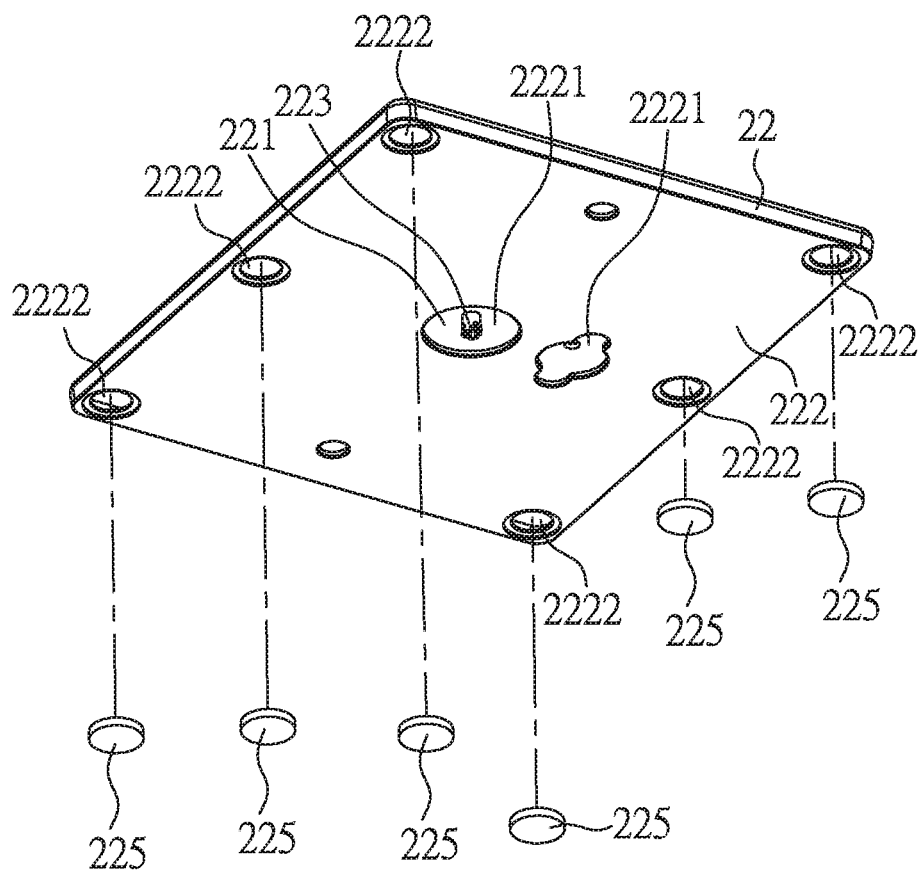
FIG. 4 is another partial perspective view of the base of the supporting device of the present invention.
Figure 4:
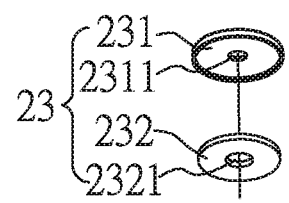

With reference to FIG. 2, FIG. 3, and FIG. 4, the base 2 mainly comprises a substrate 21 (a separate perspective view of the substrate 21 is shown in FIG. 3), a covering unit 22, and a rotating unit 23 (FIG. 4 only shows the covering unit 22 and the rotating unit 23 where the substrate 21 is omitted). As shown in FIG. 2, the covering unit 22 wraps the substrate 21, and the rotating unit 23 is disposed on the substrate 21.

The substrate 21 is a metal plate and has a first surface 211, a second surface 212, a fixing hole 213, two limiting holes 214, a center hole 215, and two fasteners 216. The second surface 212 is opposite to the first surface 211, and the second surface 212 faces toward the working surface. The fixing hole 213, the limiting holes 214, and the center hole 215 all extend through the first surface 211 and the second surface 212. As shown in FIG. 2 and FIG. 3, the fixing hole 213 is located adjacent to the limiting holes 214 and between the limiting holes 214, and the center hole 215 is formed at the center of the first surface 211 and the center of the second surface 212. The limiting holes 214 are internal threaded. In the embodiment, the fasteners 216 are screws, which are screwed into the limiting holes 214 and protrude in a direction away from the working surface. In other embodiments, the limiting holes 214 are through holes, and the fasteners 216 are nails, which are nailed into the limiting holes 214.

The covering unit 22 has an upper shell 221, a lower shell 222, a shaft 223, two protruding portions 224, and six pads 225. The upper shell 221 covers the first surface 211 of the substrate 21, the lower shell 222 covers the second surface 212 of the substrate 21, and the lower shell 222 is connected to the upper shell 221. The shaft 223 is formed on the upper shell 221, extending toward the lower shell 222, and passing through the center hole 215 of the substrate 21. The protruding portions 224, corresponding to the fasteners 216 of the substrate 21, are formed on the upper shell 21, extend in the direction away from the working surface, and are inserted in the alignment holes 11. That is, the fasteners 216 are embedded in the protruding portions 224 for enhancing the strength of the protruding portions 224. The upper shell 221, the lower shell 222, the shaft 223, the protruding portions 224, and the pads 225 can be integrally formed. In addition, the upper shell 221 has a locking hole 2211, which is aligned with the fixing hole 213. A locking unit (not shown) passes through the fixing hole 213 and the locking hole 2211 from the second surface 212 of the substrate 21, so that the upright 1 can be secured on the base 2. The lower shell 222 has two openings 2221 and six accommodating grooves 2222. The locking unit and the rotating unit 23 are disposed in the openings 2221, and the pads 225 are disposed in the accommodating grooves 2222. In other embodiments, the openings 2221 can be contacted with each other. In another embodiment, one of the openings 2221 can be omitted, and the rotating unit 23 is disposed on the lower shell 222.

The rotating unit 23 has a rotating piece 231 and a spacer 232. The rotating piece 231 has a through hole 2311, and the spacer 232 has a through hole 2321. The spacer 232 is disposed on the rotating piece 231 and attached to the rotating piece 231 with the through holes 2311, 2321 being aligned with each other. The rotating piece 231 faces the second surface 212 of the substrate 21, and the spacer 232 is in contact with the working surface. The through holes 2311, 2321 are aligned with the center hole 215 of the substrate 21, and the shaft 223 passes through the center hole 215 and the through holes 2311, 2321, to place the rotating piece 23 on the second surface 212 of the substrate 21 rotatably. However, when the supporting device 1000 is disposed on the working surface, the rotating unit 23 contacts the working surface. When an external force is applied to one of the substrate 21, the covering unit 22, the upright 1, and the display 2000, the rotating unit 23 is stationary, and the substrate 21 and the covering unit 22 drive the upright 1 and the display 2000 in a horizontal rotation with respect to the working surface. When the external force is removed, the substrate 21, the covering unit 22, the upright 1, and the display 2000 stop with respect to the working surface immediately.

In detail, when the supporting device 1000 is placed on the working surface, the pads 225 and the spacer 232 simultaneously contact the working surface to stabilize the base 2. In this embodiment, the spacer 232 is made of rubber, the pads 225 are made of flannel, and the maximum static friction between the rubber and the working surface is greater than that between the flannel and the working surface. Therefore, when the external force is applied to overcome the maximum static friction between the pads 225 and the working surface, the external force still cannot overcome the maximum static friction between the spacer 232 and the working surface. So, the spacer 232 stays stationary, whereas the substrate 21 and the covering unit 22 begin rotating horizontally around the spacer 232 with respect to the working surface. Therefore, users can easily adjust the angle of the horizontal rotation of the display 2000.

In addition, in a preferred embodiment, the second surface 212 of the substrate 21 can be attached with at least one anti-rust patch (not shown) to avoid rusting when exposed.

Besides, in other embodiments, the accommodating grooves 2222 can be omitted. Alternatively, in other embodiments, the lower shell 222 has a plurality of holes instead of the accommodating grooves 2222, so that the pads 225 can be directly disposed on the second surface 212 of the substrate 21. Or in another embodiment, the lower shell 222 is formed with a plurality of columns instead of the pads 225. The number and material of the pads 225 and the material of the spacer 232 depend on the demands and are not limited thereto, as long as the pads 225 and the spacer 232 all contact the working surface to stabilize the base 2 when the supporting device 1000 is placed on the working surface, and the maximum static friction between spacer 232 and the working surface is greater than the maximum static friction between pads 225 and the working surface.

Figure 5:
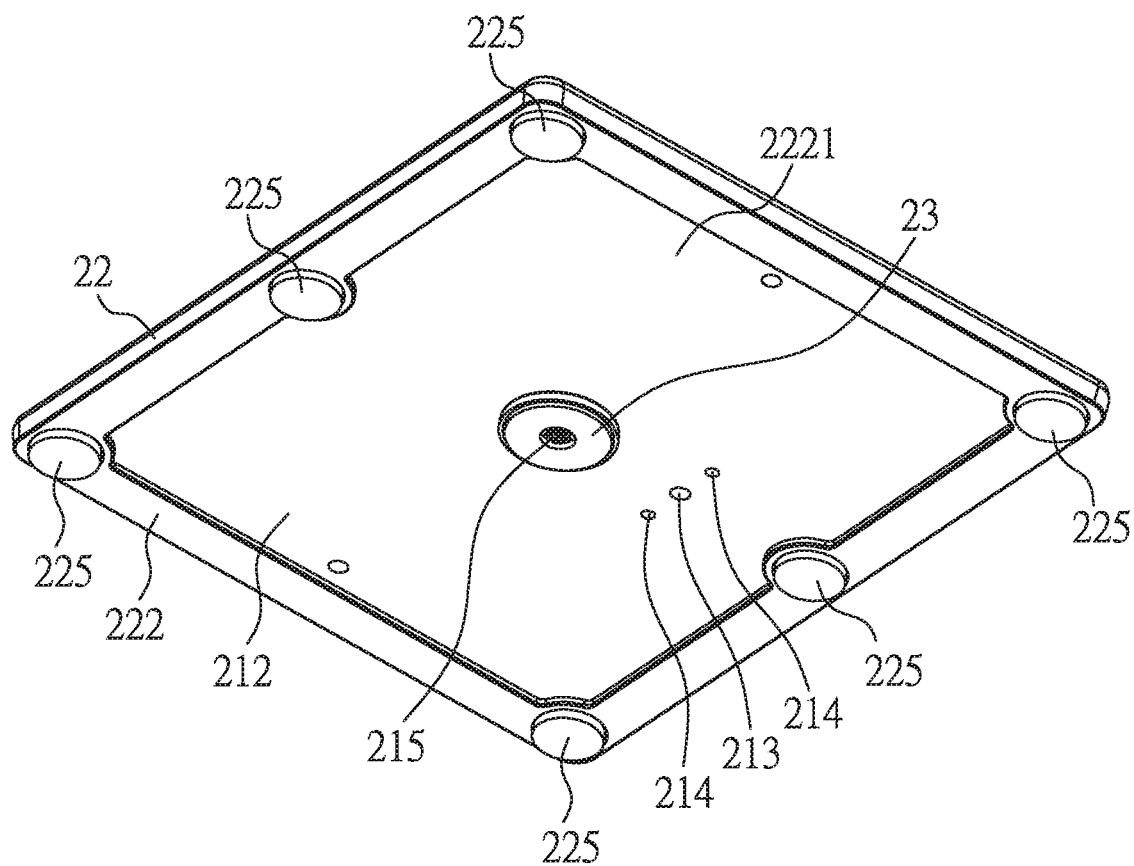
FIG. 5 is a bottom perspective view of the base of the supporting device of the present invention in another embodiment.

Next, please refer to FIG. 5, which is a bottom perspective view of the base 2 of the present invention in another embodiment. As shown, the lower shell 222 of the covering unit 22 has only one opening 2221, the rotating unit 23 is disposed on the second surface 212 with the through holes

2311, 2321 aligned with the center hole 215, and the six pads 225 are disposed on the lower shell 222 symmetrically.

The preparation method of the base 2 in this embodiment mainly includes the following steps:

Step (1): providing a substrate having a first surface, a second surface, a center hole, at least one limiting hole, and at least one fastener, wherein the fastener is secured in the limiting hole.

Step (2): fixing the substrate into a mold;

Step (3): injecting plastic material into the mold to form a covering unit wrapping the substrate; and Step (4): assembling a rotating unit to the substrate or the covering unit.

The structural features of the substrate, the covering unit, and the rotating unit in the method are similar to those stated above, and thus will not be described herein.

In the processes, the covering unit is mainly formed by injection molding to simultaneously wrap the substrate, which can greatly reduce the preparation steps and the manufacture costs.

The conventional manufacturing processes of the base generally includes: forming an upper plastic plate, a metal plate, a lower plastic plate, several assembly components and spacers, and assembling the above components. Therefore, not only the parts of the base are numerous, but the assembly procedures are complicated. Furthermore, the conventional products often have poor yield rate due to cumulative tolerance in assembly of lots of components. However, the method of manufacturing the base in the present invention directly forms a base including a substrate and a covering unit by an injection molding, which has fewer parts, rapid manufacturing processes, and a less cumulative tolerance in assembly.

In summary, the base of the supporting device provided by the present invention is formed by injection molding. The base has a simple structure, fewer assembly parts, and rapid manufacturing processes, which can greatly reduce the manufacture costs and can also increase the yield rate by reducing the cumulative tolerance in assembly. Besides, the base of the present invention features its lightness and thinness, which meets the requirements of outward appearance of supporting devices.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A supporting device for bearing a display on a working surface, the supporting device comprising:
    a base, being placed on the working surface, the base including:
        a substrate, having at least one limiting hole and at least one fastener, wherein the fastener is disposed in the limiting hole and protrudes in a direction away from the working surface;
        a covering unit, wrapping the substrate, wherein the covering unit has at least one protruding portion correspondingly wrapping the at least one fastener; and
        a rotating unit, being rotatably disposed on one of the substrate and the covering unit, wherein the rotating unit is stationary in contact with the working surface and the substrate and the covering unit are able to rotate with respect to the rotating unit when the supporting device is placed on the working surface; and
    an upright, being disposed at the protruding portion to be secured with the base for bearing the display;
    wherein when an external force is applied, the substrate and the covering unit operatively rotate with respect to the working surface by the rotating unit along with the upright and the display swiveling on the working surface, and when the external force is removed, the upright and the display are being stationary with respect to the working surface.

2. The supporting device as claimed in claim 1, wherein the covering unit further comprises an upper shell covering one side of the substrate and a lower shell covering an opposite side of the substrate, and the upper shell and the lower shell are integrally formed.

3. The supporting device as claimed in claim 2, wherein the substrate further comprises a center hole, and the lower shell has at least one opening.

4. The supporting device as claimed in claim 3, wherein the rotating unit has a rotating piece and a spacer being disposed on the rotating piece and in contact with the working surface, and the rotating unit is stationary when the substrate and the covering unit rotate with respect to the working surface.

5. The supporting device as claimed in claim 4, wherein the rotating piece and the spacer have a through hole respectively, and the covering unit further comprises a shaft extending toward the working surface and passing through the center hole of the substrate and the through holes for the rotating unit being disposed on one of the substrate and the covering unit.

6. The supporting device as claimed in claim 5, wherein the covering unit further has a plurality of pads, which are disposed on the lower shell of the covering unit and in contact with the working surface.

7. The supporting device as claimed in claim 6, wherein a maximum static friction between the spacer and the working surface is greater than a maximum static friction between the pads and the working surface.

8. The supporting device as claimed in claim 1, wherein the covering unit is formed by injection molding to embed the substrate therein.

\* \* \* \* \*